United States Patent
Deluca et al.

(10) Patent No.: US 10,967,441 B2
(45) Date of Patent: Apr. 6, 2021

(54) DRILLING SYSTEM AND MODULAR DRILLING HEAD FOR DEEP HOLE DRILLING

(71) Applicant: ALLIED MACHINE & ENGINEERING CORPORATION, Dover, OH (US)

(72) Inventors: Salvatore D. Deluca, Cadiz, OH (US); Lucas S. Dummermuth, Sugarcreek, OH (US); Michael D. Dreher, Strasburg, OH (US)

(73) Assignee: ALLIED MACHINE & ENGINEERING CORPORATION, Dover, OH (US)

( * ) Notice: Subject to any disclaimer, the term of this patent is extended or adjusted under 35 U.S.C. 154(b) by 0 days.

(21) Appl. No.: 15/928,190

(22) Filed: Mar. 22, 2018

(65) Prior Publication Data

US 2018/0272440 A1     Sep. 27, 2018

Related U.S. Application Data

(60) Provisional application No. 62/475,525, filed on Mar. 23, 2017.

(51) Int. Cl.
*B23B 51/04*     (2006.01)
*B23B 51/02*     (2006.01)
*B23B 51/06*     (2006.01)

(52) U.S. Cl.
CPC ............ *B23B 51/02* (2013.01); *B23B 51/048* (2013.01); *B23B 51/06* (2013.01); *B23B 51/0493* (2013.01);

(Continued)

(58) Field of Classification Search
CPC ... B23B 51/048; B23B 51/0493; B23B 51/02; B23B 2251/422; B23B 2251/02;

(Continued)

(56) References Cited

U.S. PATENT DOCUMENTS

| 4,611,516 A | * | 9/1986 | Hochmuth | .............. | B23B 27/16 |
| | | | | | 407/112 |
| 5,425,604 A | * | 6/1995 | Scheer | .................. | B23B 51/048 |
| | | | | | 408/201 |

(Continued)

FOREIGN PATENT DOCUMENTS

| DE | 31 25 480 | 1/1983 |
| DE | 103 14 889 | 10/2004 |

(Continued)

OTHER PUBLICATIONS

International Search Report and Written Opinion of the International Searching Authority for PCT/US18/23700 dated Jul. 20, 2018.

*Primary Examiner* — Chwen-Wei Su
(74) *Attorney, Agent, or Firm* — Hahn Loeser + Parks LLP; Scott M. Oldham, Esq.

(57) ABSTRACT

A drilling system and methods provide stability and cutting performance to produce holes having desired straightness and other characteristics. The system may include a cutting head provided with a central cutting system and first and second side cutting inserts. The tool provides a major diameter with the OD cutting margins on the replaceable side inserts, as well as possibly cutting margins on the center cutting member. Adjustment mechanisms may be provided to adjust the center cutting member and/side cutting inserts.

19 Claims, 6 Drawing Sheets

(52) U.S. Cl.
CPC ..... *B23B 2251/14* (2013.01); *B23B 2251/422* (2013.01); *B23B 2251/44* (2013.01); *B23B 2251/56* (2013.01); *B23B 2260/004* (2013.01)

(58) Field of Classification Search
CPC ............ B23B 2251/44; B23B 27/1681; B23B 27/1685; B23B 2260/004; B23B 51/06; B23B 2251/56; B23B 2251/14
See application file for complete search history.

(56) References Cited

U.S. PATENT DOCUMENTS

| | | | | |
|---|---|---|---|---|
| 6,238,151 B1* | 5/2001 | Takagi | ................ | B23B 51/0493 407/114 |
| 6,874,979 B2* | 4/2005 | Takiguchi | ............. | B23B 27/141 407/113 |
| 7,244,081 B2* | 7/2007 | Johnson | .............. | B23B 31/1075 408/144 |
| 7,556,458 B2* | 7/2009 | Heilmann | ............... | B23B 29/03 407/11 |
| 7,572,088 B2* | 8/2009 | Biscay | ................ | B23Q 11/006 408/225 |
| 7,950,881 B2* | 5/2011 | Stokey | ................ | B23B 51/0009 408/230 |
| 8,376,669 B2* | 2/2013 | Jaeger | ..................... | B23B 31/11 408/226 |
| 8,764,352 B2* | 7/2014 | Nomura | .................. | B23B 41/02 407/113 |
| 9,079,255 B2* | 7/2015 | Jager | ....................... | B23B 51/02 |
| 9,108,252 B2* | 8/2015 | Reiner | ................. | B23B 51/048 |
| 9,481,043 B2* | 11/2016 | Mergenthaler | ........ | B23C 5/2472 |
| 9,498,829 B2* | 11/2016 | Zabrosky | ............ | B23B 51/0493 |
| 9,656,327 B2* | 5/2017 | Nomura | ............. | B23B 51/0493 |
| 2003/0210962 A1* | 11/2003 | Chang | ................ | B23B 51/0493 408/211 |
| 2014/0255115 A1* | 9/2014 | Zabrosky | ............ | B23B 51/0493 408/59 |
| 2014/0291307 A1* | 10/2014 | Saegmueller | ...... | B23K 26/0823 219/121.72 |
| 2014/0301795 A1 | 10/2014 | Mergenthaler | | |
| 2019/0001418 A1* | 1/2019 | Nagel | ................ | B23B 31/005 |

FOREIGN PATENT DOCUMENTS

| | | |
|---|---|---|
| DE | 10 2011 082732 | 3/2013 |
| EP | 2 711 114 | 3/2014 |
| GB | 16948 | 11/1916 |

* cited by examiner

DRILLING SYSTEM AND MODULAR DRILLING HEAD FOR DEEP HOLE DRILLING

CROSS REFERENCE TO RELATED APPLICATION

This non-provisional application claims priority to and the benefit of U.S. Provisional Patent Application Ser. No. 62/475,525 filed on Mar. 23, 2017, which is incorporated herein by reference in its entirety.

FIELD OF THE INVENTION

The present invention relates to the field of machine tooling and particularly drilling systems, and further to deep hole drilling systems, which produce holes with a large depth to diameter ratio in a highly accurate and effective manner.

BACKGROUND INFORMATION

Certain deep hole drilling systems such as gun drills, single tube drilling systems, and double tube drilling systems are known in the art. These deep hole drilling systems may be used for drilling holes with a large depth to diameter ratio.

Solid carbide tooling is disadvantageous due to the need to regrind the cutting edges when worn, requiring removal of the tool from the drilling machine. Other problems with deep hole drilling tools include instability during drilling and at breakout. Tools having replaceable cutting heads have also been developed, which may use indexable cutting inserts. For example, there have been developed a single tube drilling system, or STS, used to drill holes having large depth to diameter ratios with improved penetration rates, hole size accuracy, and straightness as compared to gun drills. At the same time, such systems have various disadvantages, due to a single effective cutting edge, use of one or more wear pads which tend to bear on the sides of the formed hole during cutting with significant force. The wear pad tend to cause hardening of the hole and embrittlement of the material. The wear pads on the tool body are used in an attempt to provide stability to the front of the drill by making contact with the inside wall of the hole just previously drilled. The use of a wear pad on the opposing side of a major diameter cutting insert has to be set at a diameter under the insert. This causes the tool to drill under or over size due to the imbalance of cutting forces and the inability to precisely balance these forces.

Other solid drilling tools are available for drilling of holes, but have deficiencies when attempting to drill large diameter and/or deep holes. Such tools have difficulty in such applications, due to torque loading and thrust requirements. It would be desirable to provide a drilling tool that can achieve more efficient cutting in such applications, to achieve higher speed with lighter feed rates.

Problems with past tool designs also include issues such as chips remaining in the hole between the body diameter and the inside of the hole or inability to effectively evacuate chips during drilling. Such occurrence causes significant problems in efficient and precise drilling, and adversely affect cut quality and cutting tool life.

For many applications, there is a need for tooling that can more effectively produce holes with a large diameter or large depth to diameter ratio, with high accuracy and in a cost effective manner. It would therefore be desirable to have a tool that provides stability and keeps the drilling on center. It would also be desirable to provide tooling that allows simple and flexible set-ups and modularity to provide adjustment which allows the tool to more effectively drill large depth to diameter ratio holes with high accuracy in various applications and materials.

SUMMARY OF THE INVENTION

The invention is therefore directed to a drill system comprising a generally cylindrical holder body member. A replaceable cutting head is mountable to the front end of the holder body. A central cutting system, such as cutting insert, is attached to the cutting head, and has first and second cutting edges extending from the rotational axis of the cutting head. Additionally, first and second side cutting inserts are mountable to the cutting head, each having a cutting edge extending from adjacent the central cutting member to cut the major diameter of a hole.

Other aspects of the invention will be apparent to those of skill in the art in view of the following written description and drawings relating to examples of the invention.

DETAILED DESCRIPTION

Figure 1:
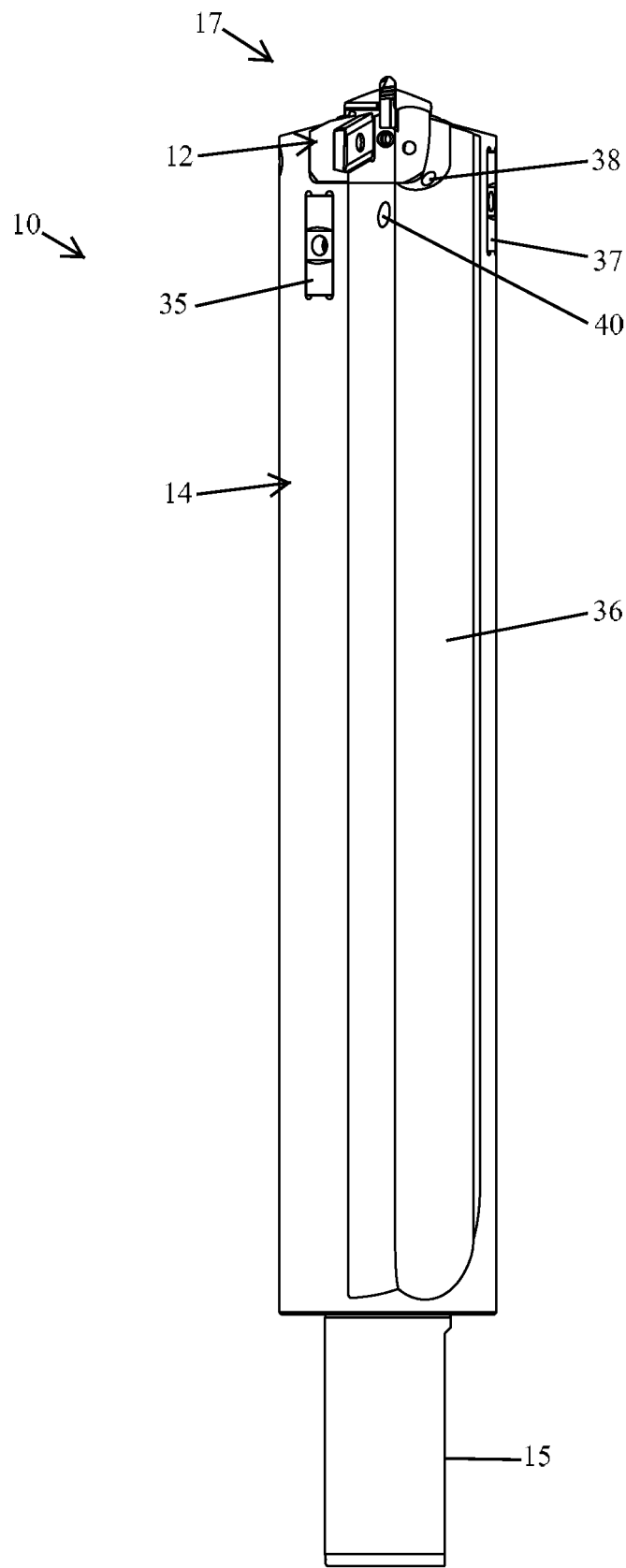
FIG. 1 shows a side view of a drilling system according to an example of the present invention.
Figure 2:
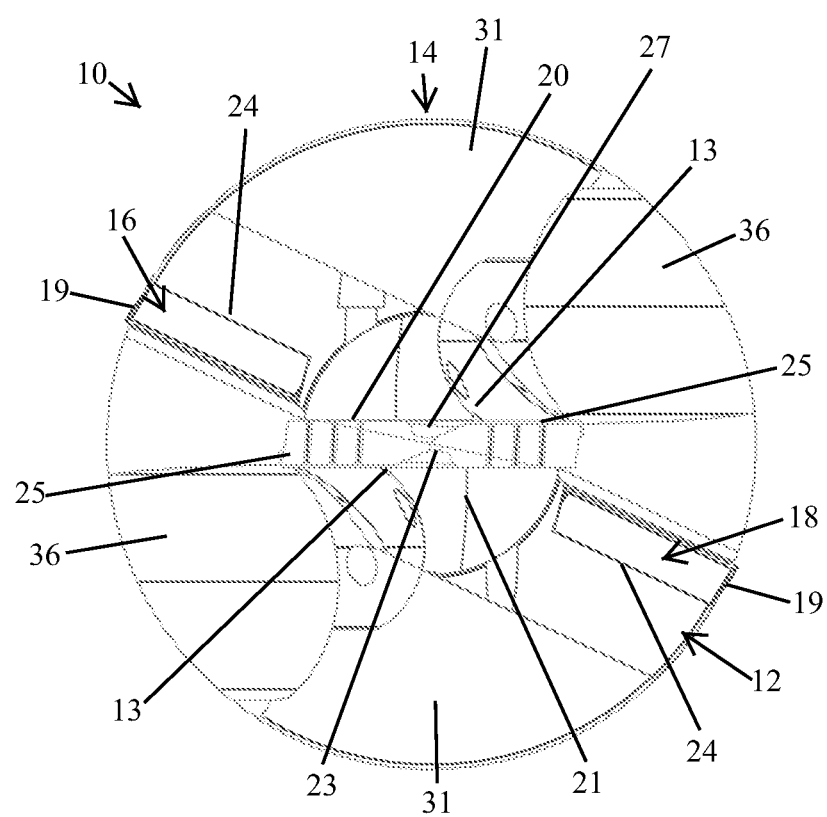
FIG. 2 shows a top view of a drilling system as shown in this example.
Figure 3:
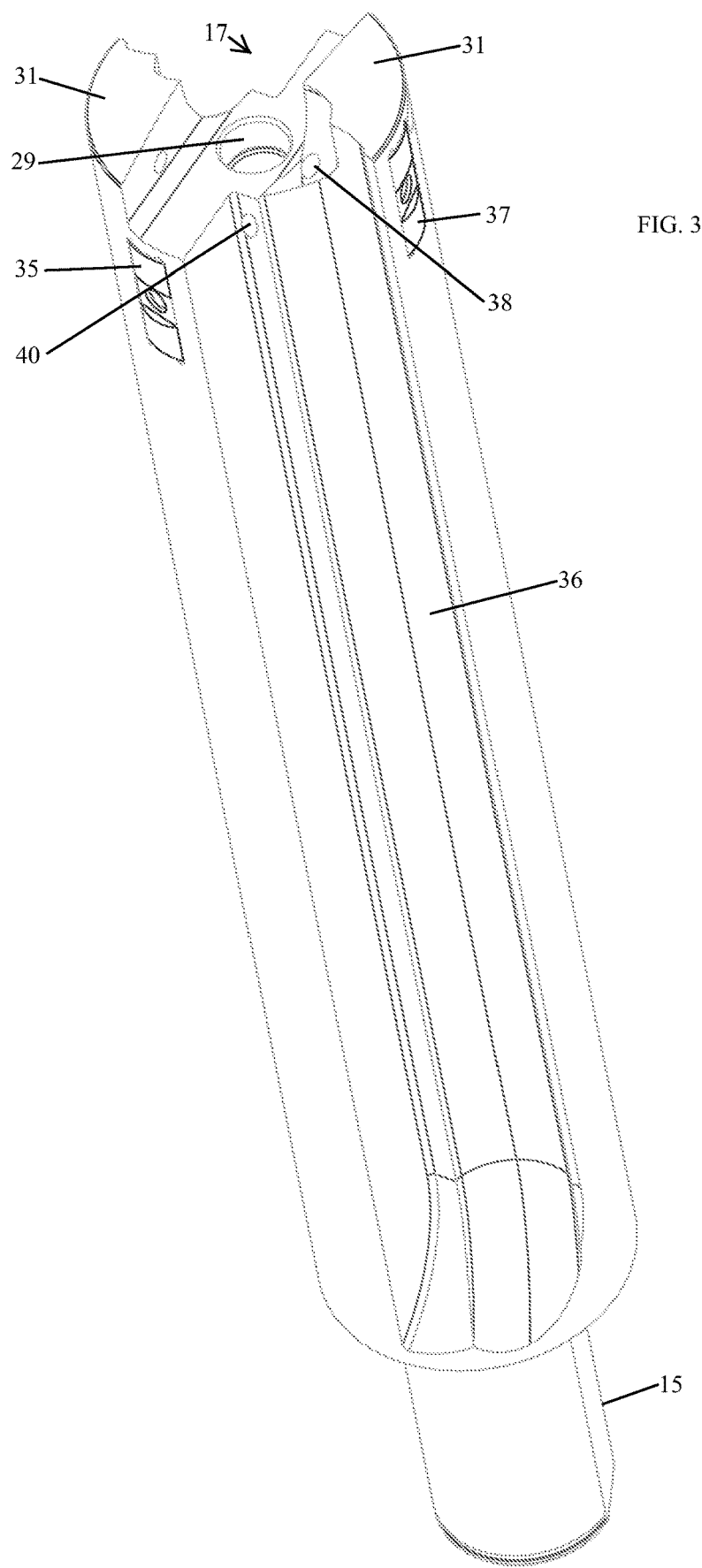
FIG. 3 shows a side view of a holder body as shown in this example.
Figure 4:
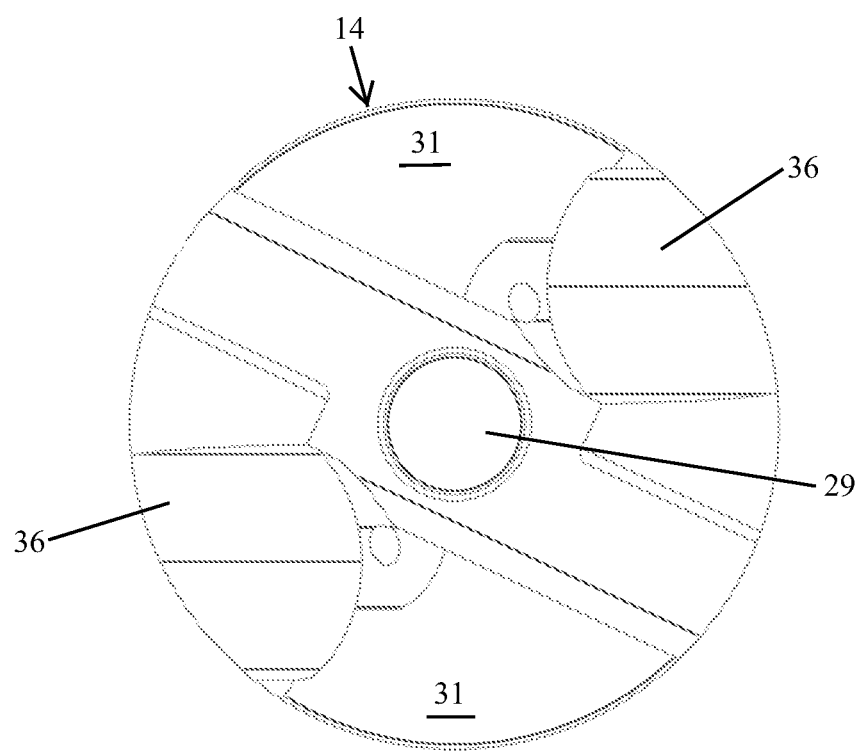
FIG. 4 shows a top view of a holder body as shown in this example.

Referring now to FIG. 1-4, an example of a drilling system according to the invention is shown. As shown in FIGS. 1-2, the drilling system 10 includes a drilling head 12 and an holder body or shank 14. The drilling system 10 of this example utilizes a through tool coolant system to be described hereafter, to provide coolant to the area of drilling head 12, and allows coolant to flow around the drilling head 12 and back through the flush channels 36, thereby efficiently flushing metal chips produced during drilling out of the hole. The drilling system may be configured to provide a cutting fluid delivery system to provide a desired volume of cutting fluid at desired pressures for a particular application.

Figure 5:
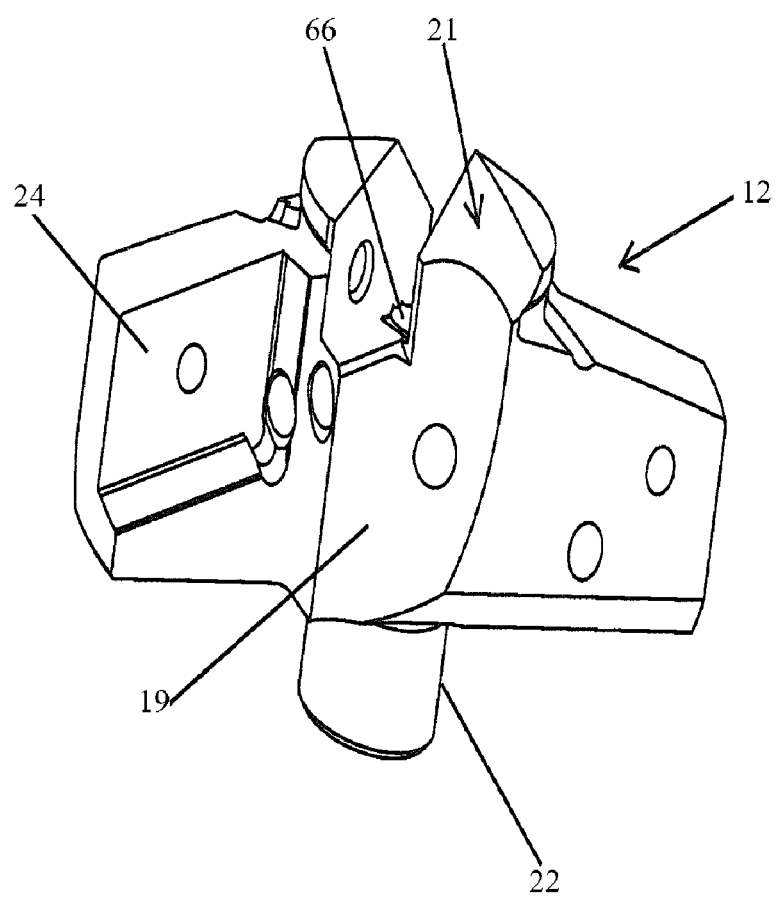
FIG. 5 shows an alternative modular drilling head.

In this example, the drilling head 12 is designed to support a plurality of cutting inserts. The drilling head 12 of this example includes a central insert 20 supported in the drilling head 12 and side cutting inserts 16 and 18, positioned in side insert pockets 24 formed in the drilling head 12. A central guide post 22 (see FIG. 5 for example) at the bottom center of the drilling head 12 is provided to facilitate positioning of the modular drilling head 12 onto the body 14. Flute areas 13 are provided adjacent the central insert support 21 for evacuation of machined chips from the central cutting insert 20. As seen in this example, a central cutting insert 20 may be provided as a spade type of drilling insert having an approximately flat polygonal shape having first and second faces and first and second side edges. The cutting insert may comprise one or more mounting apertures through the first and second faces, and fastened to ears or supports 21 formed on the drilling head 12. The cutting insert 20 may further comprise a self-centering point 23, cutting edges 25 extending from the point 23 and optionally one or more chip breakers. The use of one or more chip breakers may facilitate controlling the width of chips produced by the cutting insert 20. Controlling the chip width facilitates effective evacuation of chips through the flutes 36 for example. In some applications, chip breakers may not be required, for example with use in cutting cast iron or carbon fibers. The cutting edges 25 are positioned at the leading edges as the insert 20 rotates. The cutting insert 20 may be an approximately symmetrical shape with the axis of rotation passing through the self-centering point 23. In a particular example, the insert 20 may further include a central cutting web 27 with web cutting edges adjacent the point 23. The use of one or more web cutting edges in conjunction with cutting web 27 adjacent the point 23 facilitates enabling the material at the tip of the cutting insert 20 to shear and form a manageable chip. The web cutting edges may be radiused or notched with flat surfaces to facilitate use with different applications, or may be a v-notch configuration such as shown in U.S. Pat. No. 7,371,035 for example. The provision of a cutting web 27 may enable chip formation at the drill point and reduce extrusion due to the shearing ability of the cutting web. Further, the cutting web 27 may enable the drill cutting insert 20 to start the hole on-center and to retain its straightness. Further, at least one cutting lip may be positioned adjacent one or more cutting edges 25. The cutting lip may include geometry capable of producing curled metal chips for evacuating from the hole. The central cutting insert 20 may be the T-A or Gen2 T-A product produced by Allied Machine & Engineering Corporation, of Dover, Ohio for example, or a different type of central cutting member may be used, such as one or more indexable inserts, twist drills or other cutting members for machining of a metal or other workpiece.

In this example, there may also be provided first and second side cutting inserts 16 and 18, for cutting the outside diameter of the hole. The side inserts 16 and 18 are mounted in pockets 24 formed in the drilling head 12. The side inserts 16 and 18 may be indexable to provide multiple cutting edges that can be successively used after wear of a cutting edge, or could be non-indexable cutting inserts. In this example, the center insert 20 is mounted to drilling head 12 via mounting screws that engage the mounting ears 21. The drilling head 12 is mounted to the body 14 and fastened by one or more screws or the like, that draws the modular drilling head 12 onto the body 14 and forces the modular head against extensions or ears 31 formed on the body 14. The coupling of the inserts and modular head may be performed by any suitable fastening system.

In association with this example, the inserts 16 and 18 are designed with margins 19 to facilitate precise machining. In this example, the inserts 16 and 18 are rhomboid shaped, but other shapes may be used. The insert design provides margined inserts 16 and 18 at the major drilling diameter to provide stability on entry, during the drilling cut cycle, and during the breakout on through hole applications. The use of the drilling system is not limited to through hole applications, and can also be used on blind hole applications or other hole applications. As indexable inserts in this example, the inserts 16 and 18 include margins 19 on both edges. In this example, the double margin inserts 16 and 18, with cutting margins 19 located at the major drilling diameter, are rotated out from the center insert 20 margined OD plane. The angle between the cutting plane of the side cutting inserts 16 and 18 and the cutting plane of the center cutting member 20 may be between 5°-60°. The rotation of the cutting plane of the side inserts 16 and 18 away from the cutting plane of the center cutting member 20 also breaks up the harmonics of the system, reducing drill vibration and tool chatter. This arrangement provides the drilling system with four points of margined support in the drilling operation which increases the overall stability. This overall stability control will produce a truer hole and also aid in the surface finish in the cut with the four points of margin contact. This maintains the drill on centerline as the tool does not have the increased opportunity to move radially off the centerline of the hole during the drilling cycle. Alternatively, the cutting plane of the side inserts 16 and 18 do not have to be rotated relative to the cutting plane of the center insert 20. The ability to index the side inserts 16 and 18 to reveal a new cutting edge and provide the same margin support as noted above adds additional value due to the increased overall life that the inserts 16 and 18 will have. Further, in operation, when the cutting edges on inserts have reached their expected life, the cutting inserts can be removed from the drilling head 12 and new cutting inserts easily installed and the drilling process continued.

In this example, the holder body 14 may comprise a generally circular shape having a first end, or shank end 15, and a second end 17. Evacuation flutes or channels 36 are formed on opposing sides of body 14, for passing chips and cutting fluid from the drilled hole. The shank end 15 of the holder body 14 may be coupled to a drilling machine in any suitable manner. There may also be provided in this example, drill guide pads 35 set under the major drilling diameter adjacent the side inserts 16 and 18 for clearance to avoid creating a seizure of the tool or marring of the drilling surface in the cut. Further guide pads 37 are positioned at about ninety degrees from pads 35 and adjacent the flutes 36. The first and second wear surfaces provided by pads 35 and 37 in this example are offset axially. The guide pads 35 and 37 give support to the tool during the drilling cycle. The pads may be screwed into position or otherwise suitably attached. The pads may be formed of a carbide material or ground carbide material such as titanium carbide, a tungsten carbide, aluminum bronze, high speed steel, hard chroming or other suitable wear material. The pads serve as bearing areas for the holder body 14 to support the tool in an interrupted cut situations for example, (i.e. drilling through a cross hole or an uneven breakout), as well as tending to force the tool to run straight if the tool begins to lead off during the cut. Alternative wear surfaces may be used. Coolant is provided through holes 40 formed in the body 14, which directs coolant to the cutting edges of the cutting inserts 16 and 18. Coolant may also be provided to holes 38 to the cutting surfaces of the insert 20, and lubricate the area where guide pads 35 and 37 are positioned along with holes 40. The clearance on the back side of the inserts allows coolant to flow up and over the inserts, simultaneously forcing the chips into the flutes or channels 36, and out of the hole.

Figure 6:
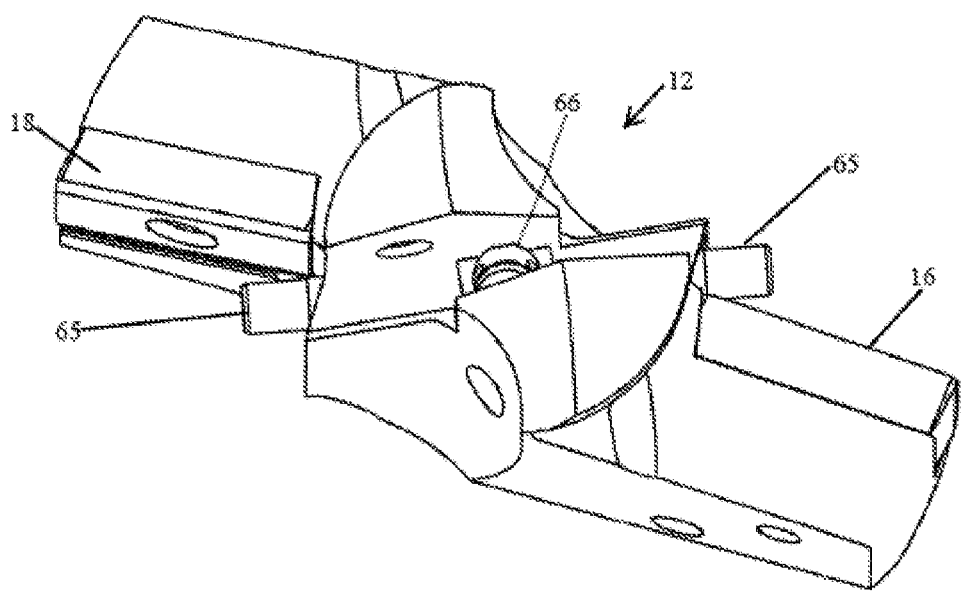
FIG. 6 shows a drilling head with adjustable central insert according to an example.
Figure 7:
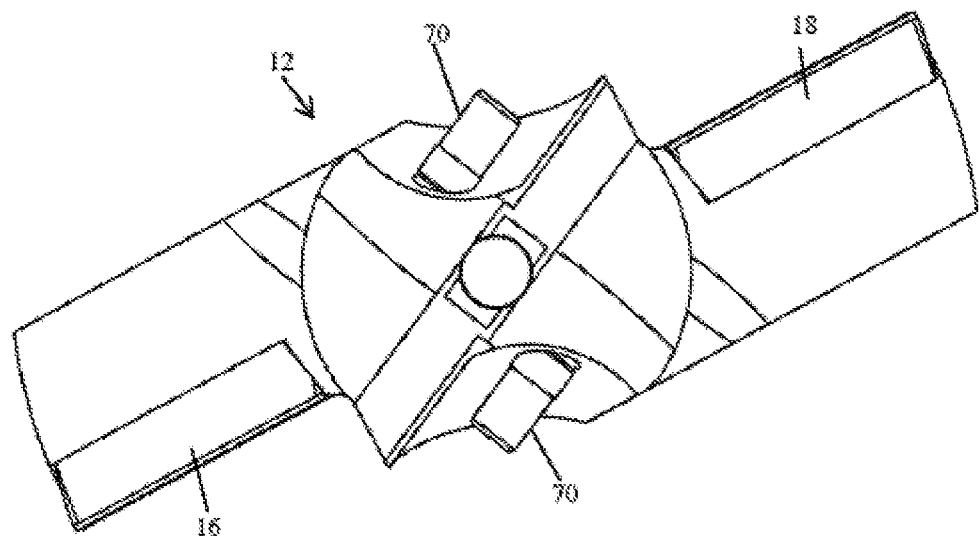
FIG. 7 shows a drilling head with adjustable OD inserts according to an example.

This example of the invention also provides a modular drilling head 12 that allows the replacement of drilling head 12 in an easy manner in the case of damage. The system 10 of the invention allows a user to easily rebuild the tool in the event of minor tool failures. The replaceable drilling head 12 that serves as an insert holder allows rebuilding of the system without replacing costly holder bodies 14. Also, as seen in FIGS. 6 and 7, the center insert 20 and/or two side inserts 16 and 18 may be adjusted. As seen in FIG. 6, adjustability of the center insert 20 may be provided by two set screws 65 positioned under the slot for positioning of the insert 20. The set screws 65 allow pushing the pin (not shown) of the center insert 20 that locates in hole 66 radially in the same plane of the insert margins. This gives the user the ability to negate the buildup of manufacturing tolerances and ensure that the center insert 20 is running centrally by taking out the TIR. When center insert 20 is running in near-perfect on center condition, the cutting forces are more evenly balanced and the system drills straighter. This also helps keep the system on center through the entire drilling process as opposed to starting out with some TIR and not being able to correct this. When the tool starts the drilling process in an out of center condition it will have a greater probability to run-out, and over a long length of cut this increases exponentially. The adjustment of the center insert 20 may allow the user to compensate for the stack up of manufacturing tolerances in the connection to the components of the system, to facilitate proper precise drilling.

Similarly, with reference to FIG. 7, the position of the side inserts 16 and 18 can also be adjusted. The second portion of adjustability is designed for the major diameter cutting of the double effective cutting double margin inserts 16 and 18. Two additional set screws 70 may be provided with the drilling head 12, to provide the ability to push on the inside wall clearance angle of the inserts 16 and 18, thereby moving one or both of the inserts 16 and 18 axially to adjust the major diameter of each insert 16 and 18. This adjustability allows the user to overcome the buildup of manufacturing tolerances so that the major cutting diameter could be set to a near perfect condition for both inserts 16 and 18. Setting both of the inserts 16 and 18 as close as possible to the major cutting diameter desired ensures that the cutting forces will be well balanced, allowing for more even wear of the inserts 16 and 18, as well as a more precise drilled hole size. The design being setup as a double effective cutting tool also allows for a significant increase in allowable penetration rate versus a single effective tool.

The disclosed drilling system 10 also provides additional flexibility to meet objectives for different applications. For example, the substrate, coating, and geometry options may allow for the system 10 to function in applications where prior art drills fail. The substrate material of the cutting inserts 20 and/or 16 and 18 may be changed to accommodate different types of applications. Also, different coatings may be usable in association with the inserts 20 and/or 16 and 18. For example, a diamond film coating may be used on the cutting edges and clearance surfaces of inserts 20 and/or 16 and 18 to minimize flank wear growth. An example of these types of films include carbon vapor deposition (CVD) polycrystalline diamond film. Diamond film coatings may be helpful when cutting non-metallic abrasive materials for example. Other coating materials, such as titanium aluminum nitride or other suitable materials, may be used. The inserts 20 or 16 and 18 may be coated by known suitable methods, with a desired coating based upon a particular application for the system 10. The use of inserts 20 and 16 and 18 also allows the cutting geometry to be formed for various applications, with various modifications in cutting geometry possible to enhance the cutting performance for different applications or materials. For example, different cutting geometries may include, but are not limited to, the cutting lip geometry having a positive rake angle, the cutting web having a positive rake angle, the insert 20 having a self-centering point, and/or providing a desired chip breaking configuration in association with the cutting edges. Positive cutting lip geometry produces a tightly curled chip that is easy to evacuate through the tool, with the compact size of the chip resulting from the predetermined lip position, size and configuration. Many modifications can be made to the lip configuration to enhance the development of chip formation for example.

A second significant improvement with the disclosed drilling system is a reduction in cost per hole. This may be realized in several different ways. When the tool is worn out or damaged, the modular design of the drilling head 12 in conjunction with a body 14 avoids the need to replace the head and/or body. This can be costly, especially as the hole diameter increases. With the presently disclosed invention, an operator may replace the worn or damaged cutting inserts 20 and 16 and 18 easily, without affecting set up of the system. The drilling system thus provides the ability to quickly and efficiently change the cutting edges when they become worn. The cost of the holder body 14 may be amortized over multiple cutting insert changes reducing the total tool cost.

The cost per hole can also be calculated based on an increased penetration rate. The presently disclosed drilling system includes two effective cutting edges from the center to the OD. This design can offer a significant performance improvement or advantage over a single effective cutting tool. With two effective cutting edges, the system may allow doubling of the feed rate of a comparable single cutting edge design. This increased penetration rate reduces the time in the cut freeing up machine time. The arrangement according to the examples of the present invention provides various improvements and overcomes problems associated with prior systems. For example, the arrangement does not result in work hardening of the material adjacent the hole, as no significant forces are imposed on the sides of the formed hole. The drill guide pads are not bearing on the sides of the hole with significant force, but instead are used to facilitate guiding the tool during cutting. The cutting geometry provided by the center insert 20 and side inserts 16 and 18 may comprise an included angle such as in the example of the drilling head 12 in FIG. 5, so that radial loads imposed by the system are minimized, and heat generation is also minimized, such that no embrittlement of the machined material occurs. The double effective tool is capable of running at higher penetration rates, while having modular capability. This double effective design in conjunction with both of the major diameter cutting inserts having adjustability ensure that the margins of the tool run concentric and on size, allowing the system to drill straighter, provide a better surface finish, and increase the overall stability of the tool during the drilling process. The drilling system 10 in accordance with the present invention may include a variety of features and attributes to promote stability and chip removal, and maximize the precision of the drilling operation while increasing tool life.

It should be recognized that the drilling system of the invention is not limited to the exemplary drill system as shown. The configuration described herein and the particulars thereof can be readily applied to a variety of systems and applications. It is therefore understood that the above-described embodiments are illustrative of specific embodiments which can represent applications of the invention. Numerous and varied other arrangements can be made by those skilled in the art without departing from the spirit and scope of the invention.

What is claimed is:

1. A drilling system comprising a generally cylindrical body member having an outer surface, a replaceable cutting head mounted to the front end of the body member having a central cutting system with first and second cutting edges extending from the rotational axis of the cutting head, and first and second side cutting inserts disposed outwardly from the central cutting system, the side cutting inserts each having a cutting edge extending from adjacent the first and second cutting edges of the central cutting system to cut the major diameter of a hole, wherein the side cutting inserts are indexable and have first and second opposed cutting edges and first and second sides extending between the first and second cutting edges forming first and second margins, with one cutting edge and one margin exposed when the side inserts are mounted in pockets formed adjacent the central cutting system in the cutting head, each exposed margin having a length that extends beyond the entire outer edge of the pocket, each having a parallel margin plane that engages the hole on entry of each side cutting insert, during the drilling cut cycle, and during the breakout on through hole applications or an interrupted cut.

2. The drilling system of claim 1, the central cutting system is adjustable relative to the plane of the side cutting insert margins.

3. The drilling system of claim 1, wherein guide surfaces are provided adjacent and below the major diameter of the first and second side cutting inserts.

4. The drilling system of claim 1, where the guide surfaces do not bear on the sides of the hole with significant force.

5. The drilling system of claim 3, where the guide surfaces are provided by guide inserts attached to the body member.

6. The drilling system of claim 3, further comprising separate coolant holes formed in the body member to direct coolant to the cutting edges of the side cutting inserts that further supply coolant to the area of the guide surfaces.

7. The drilling system of claim 3, further comprising guide surfaces positioned at about ninety degrees from the guide surfaces provided adjacent and below the major diameter of the first and second side cutting inserts.

8. The drilling system of claim 1, where the side cutting inserts have a cutting plane that is offset from the cutting plane of the central cutting system.

9. The drilling system of claim 1, where the central cutting system has outer edges forming a margin along the entire exposed length of each outer edge, such that there are four parallel lines of margin support when the central cutting system and first and second side cutting inserts are engaged in a hole during drilling.

10. The drilling system of claim 1, where the central cutting system is an insert positioned in a slot in the holder body and extending above the slot with outer edges providing a margin that engages the hole along the entire exposed length of the outer edges.

11. The drilling system of claim 1, further comprising an adjustment mechanism associated with the central cutting system to adjust the centerline position of its cutting action.

12. The drilling system of claim 1, further comprising an adjustment mechanism associated with each of the first and second side cutting inserts to adjust the diameter of the cutting performed by the side cutting inserts.

13. The drilling system of claim 1, further comprising an adjustment mechanism associated with the central cutting system to adjust the centerline position of its cutting action, and an adjustment mechanism associated with each of the at least first and second side cutting inserts to adjust the diameter of the cutting performed thereby.

14. The drilling system of claim 1, further comprising separate coolant holes formed in the body member to direct coolant to the cutting edges of the side cutting inserts and central cutting system.

15. The drilling system of claim 14, wherein the cutting edges of the side cutting inserts have clearance on the back side of the inserts and the coolant holes are positioned to supply coolant to flow up and over the clearance on the back side of the inserts.

16. A drilling system comprising a generally cylindrical body member, a replaceable cutting head mounted to the front end of the body member having a central cutting insert with first and second cutting edges extending from the rotational axis of the cutting head, and first and second side cutting inserts, each having a cutting edge extending from adjacent the central insert to cut the major diameter of a hole, an adjustment mechanism associated with the central cutting system to adjust the centerline position of the cutting action of the first and second cutting edges, and an adjustment mechanism associated with each of the first and second side cutting inserts to adjust the diameter of the cutting performed by the side cutting inserts.

17. The drilling system of claim 16, further comprising first wear surfaces adjacent and below the first and second side inserts and second wear surfaces at about ninety degrees from the first wear surfaces.

18. The drilling system of claim 17, where the first and second wear surfaces are offset axially.

19. The drilling system of claim 16, where the central cutting system is at least one insert and includes outer edges having a cutting margin.

* * * * *